Oct. 23, 1928.

S. O. WHITE 1,689,180

TRANSMISSION GEAR

Filed Nov. 10, 1924    2 Sheets-Sheet 1

INVENTOR
Samuel O. White,
BY
Hood + Hahn.
ATTORNEYS

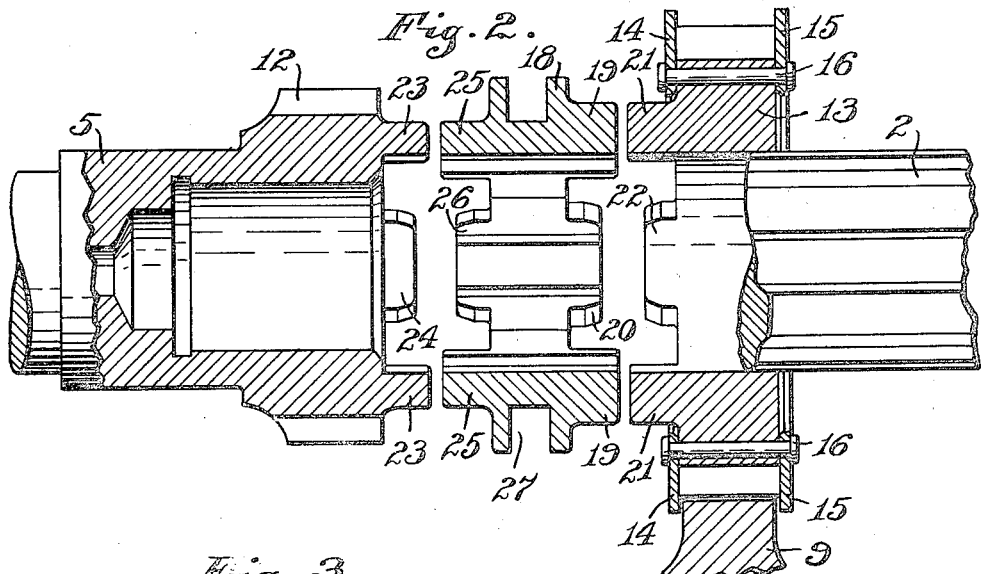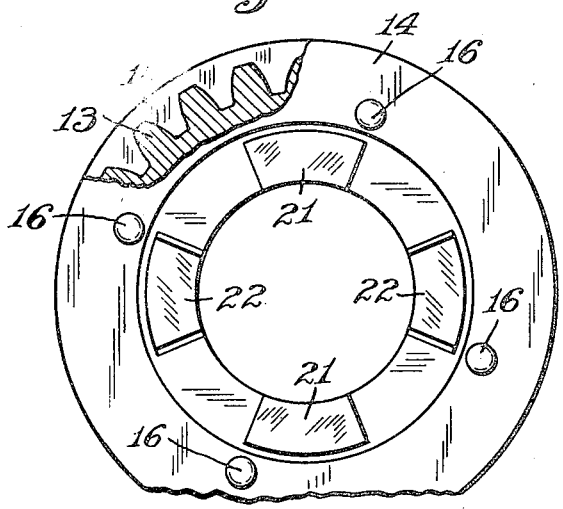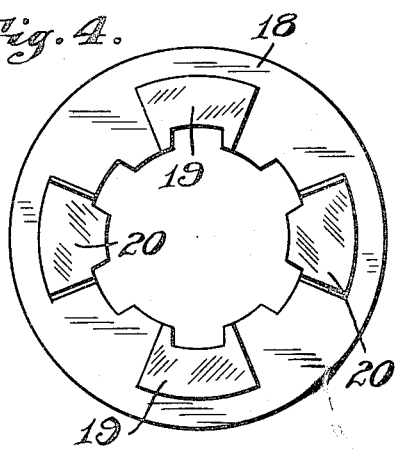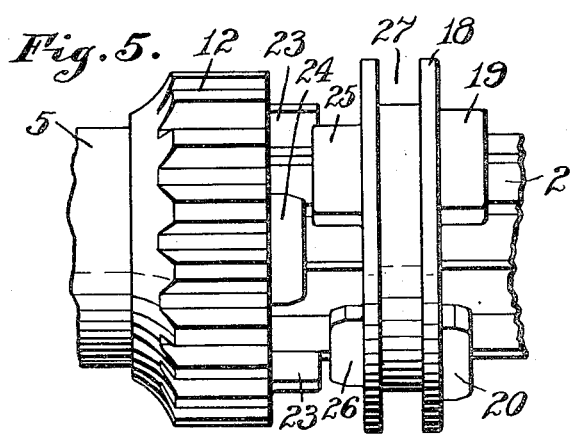

Patented Oct. 23, 1928.

1,689,180

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

TRANSMISSION GEAR.

Application filed November 10, 1924. Serial No. 748,823.

My invention relates to improvements in transmissions for automobiles and the like and has for one of its objects the provision of a transmission gearing in which the various speed changes may be quickly and silently accomplished and in which certain of the speed changes may be accomplished irrespective of the speed at which the gears are rotating. A further object of my invention is to provide a transmission of the above type which may be produced at a minimum cost and which may be assembled and disassembled with the minimum expenditure of labor and time.

For the purpose of disclosing my invention I have illustrated one embodiment thereof in the accompanying drawings in which, Fig. 1 is a longitudinal section of a transmission embodying my invention;

Fig. 2 is an associated view, the parts being in section, of the clutch members for connecting certain of the gears to the driving shaft;

Fig. 3 is a face view of the floating gear;

Fig. 4 is a face view of the shifting clutch member, and

Fig. 5 is an elevation showing the clutch members partly engaged.

Figure 1:
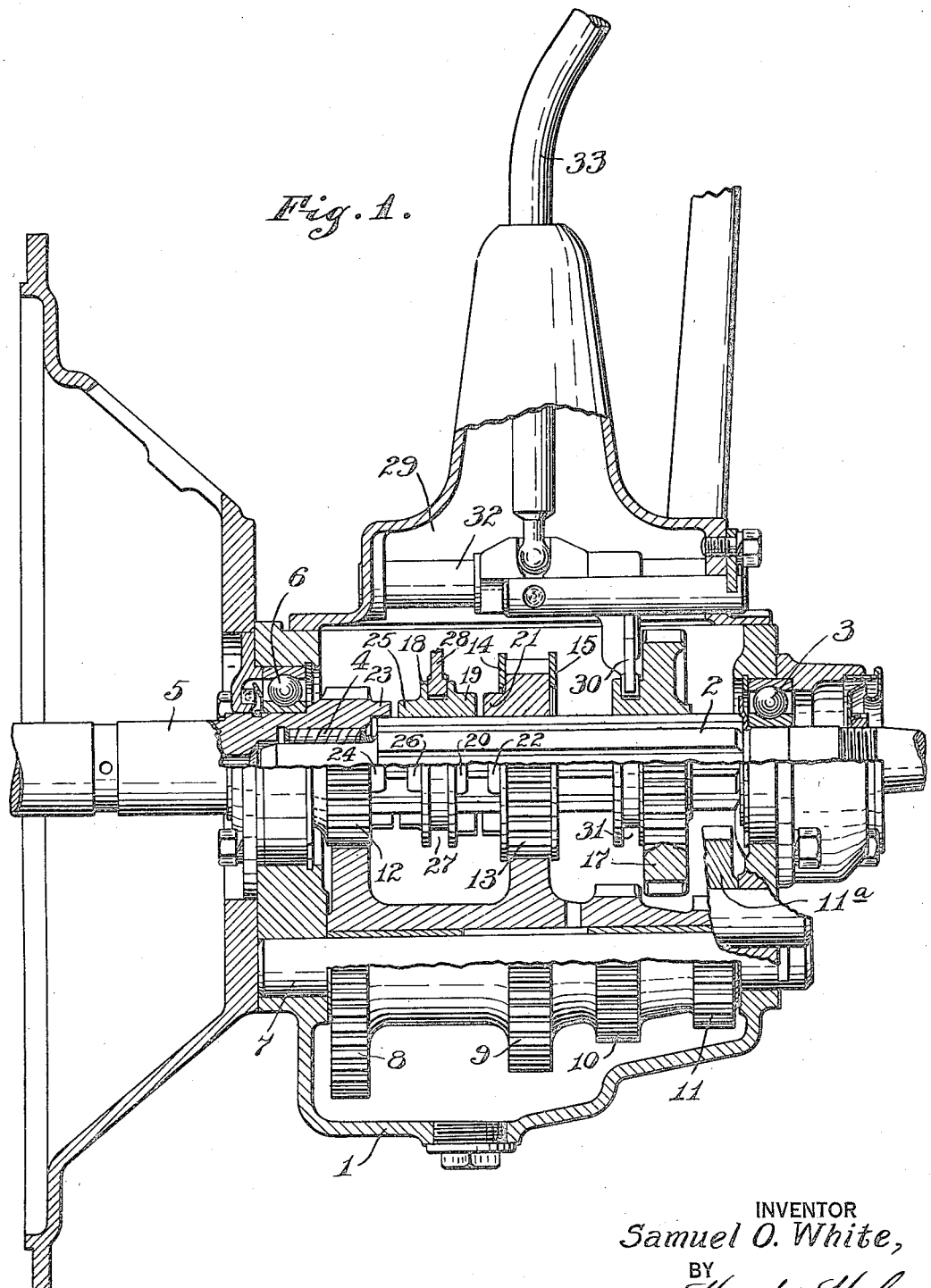

In the embodiment illustrated I provide the usual gear casing 1 having mounted therein the splined driving shaft 2, one end of which is mounted in a ball bearing 3 in turn mounted in one end of the casing. The opposite end of the shaft 2 has a bearing 4 in the end of the clutch shaft 5 in turn journalled in a ball bearing 6 at the opposite end of the casing. It will be noted that the openings in the two ends of the casing for accommodating the shafts 2 and 5 are in alignment so that the shaft 2 may be inserted in position in the casing by passing the same directly through these aligned openings. Also mounted in the ends of the casing 1 and below the shaft 2 is a counter-shaft 7. This counter-shaft 7 has rotatably mounted thereon a plurality of gears 8, 9, 10 and 11, mounted on a common spindle. The gear 8 is large in diameter and adapted to mesh with a small diameter pinion 12 formed on the end of the clutch shaft 5. The gear 9, which is slightly larger in diameter than the gear 10, is adapted to mesh with a gear 13 floatingly mounted on the splined shaft 2. In order to prevent drifting of the gear 13 as, in the construction illustrated, it is necessary for this gear to remain longitudinally stationary on the shaft. The gear is provided with a pair of peripheral guards 14 and 15 in the form of rings which are secured by rivets 16 to the faces of the gear, which guards overlap the sides of the gear 9 and as the gear 9 is prevented from longitudinal movement on its shaft the gear 13 will likewise be prevented from longitudinal movement on its shaft. Furthermore, this means for holding the gear 13 on the shaft provides for a very ready assembly of the parts. In assemblage the counter-shaft 7 and its gears are assembled in the casing, after which the gears adapted to be mounted on the shaft 2 are positioned preferably by laying the same on top of the gears with which they mesh, including the gear 13 which, due to the guards 14 and 15, will be accurately positioned relatively to the gear 9, and the shaft 2 then slipped in through the aligned openings in the opposite ends of the casing. The gears 13 and 9 are in constant mesh with one another and the gears 12 and 8 are in constant mesh with one another, so that gears 8 to 11 are constantly driven but, due to the fact that gear 13 floats on shaft 2 it may rotate without affecting this shaft until connected thereto by a clutch hereinafter described. A second gear 17 is splined on the shaft 2 and therefore has longitudinal movement on this shaft and this gear is adapted to be moved into mesh with the gear 10 on the counter-shaft 7 or a reverse gear 11$^a$ driven from and meshing with gear 11. The gears above described constitute the usual speed changes of an automobile transmission.

Splined on the shaft 2 is a double faced clutch member 18 having on one face a set of jaws 19 and 20, the jaws 20 being shorter than the jaws 19. A similar set of jaws 21 and 22 are formed on the face of the gear 13 to co-operate with the jaws 19 and 20. A similar set of jaws 23 and 24 is formed on the end of the shaft 5 to co-operate with the jaws 25 and 26 on the clutch member 18. I prefer to form each of the clutch members with four jaws, the spacing between the jaws being equal and the jaws being of equal width. Two of the jaws, however, are shorter in length than the other two and the long and short jaws are alternately arranged, thereby providing primary (the long) jaws and secondary (the short) jaws. Due to this arrangement the space between the primary jaws is considerably greater than the width of the primary jaw on the opposite member whereby ample time will be permitted for the jaws to move into engagement with one another when the different clutch members are being relatively rotated. As soon, however, as the primary jaws make engagement and continue to move axially, the secondary jaws will come into play so that when the two clutch members are finally engaged there will be no danger of back lash between the members. This arrangement makes for quick and easy shifting of gears and in the structure illustrated the arrangement is such that this type of shift is provided for intermediate and high speeds, whereby ready shift from high to intermediate or from intermediate to high may be made irrespective of the speed at which the parts are traveling. This is particularly advantageous where the transmission is used in automobiles as it enables a flexible and quick change in speeds without clash of gears and without danger of the stripping of gears.

The clutch member 18 is provided with an annular groove 27 adapted to be engaged by a fork 28 operated by the usual shifting mechanism 29 so that the clutch member 18 may be caused to engage either the clutch on the shaft 5 or the clutch on the floating gear 13.

The gear 17 is splined on the shaft 2 and is moved longitudinally on the shaft by means of a fork 30 in engagement with a groove 31 in the hub of this gear 17 so that the gear may be shifted into sliding engagement with the gear 10 or with the reversing gear 11ª driven from gear 11.

The above arrangement provides for a transmission having three speeds forward and one reverse. When the gear 17 is in engagement with the gear 10, the shaft 2 will be driven at first or low speed from the clutch shaft 5 through the gear 12, the gear 8, the gear 10 and gear 17. When the gear 17 is moved into engagement with the reverse gear and thereby driven by gear 11ª, the shaft 2 is driven in the reverse direction. By shifting the gear 17 out of engagement with the gear 10 and reverse gear and moving the clutch member 18 to cause the jaw clutches 19 and 20 to engage with the jaw clutches 21 and 22 on the floating gear 13, this floating gear will be connected with the shaft 2 and the shaft 2 then driven at second speed from the shaft 5, gear 8, gear 9 and gear 13. By shifting the clutch member 18 in the opposite direction to mesh the jaws 23 and 24 on the shaft 5 and jaws 25 and 26 on the clutch member 18 the shaft 2 will be driven direct from the shaft 5 or at third or high speed.

As is usual in this type of transmission the fork 30 is mounted on a slide rail 32 and the fork 28 is mounted on a slide rail of similar construction, the respective forks being adapted to be engaged by a shifting lever 33 which is moved transversely in one direction to engage one fork and in the opposite direction to engage the opposite fork. By moving the lever longitudinally in one direction the gear 17 is shifted forward for engagement with the low speed gear and rearwardly for engagement with the reverse gear. Likewise, when the lever is shifted laterally in the opposite direction the clutch member 8 may be shifted rearwardly for connecting the gears in second speed or forward for connecting the gears in third or high speed. This is the standard gear shift at present used in automobiles. It has been found in certain types of the full floating gear transmission, that is, where the first, second and third and reverse speeds are all attained by means of certain forms of clutch connections with the drive shaft, the shifting from one speed to another is so easily accomplished that the operator in shifting from first or low speed to second is very apt to slip into reverse instead of second speed, thereby causing serious damage to the transmission. This is particularly so as the shift from low to reverse is caused by a right line movement of the shifting lever, while the shift from low to second requires, after the shift out of low, a lateral movement of the lever before it is continued in its forward movement to shift into second. For this reason I provide a sliding gear type of gear for low and second speeds as this type offers a certain amount of resistance and the danger of shifting from low into reverse is not so great. Furthermore the sliding gear type of connection for low and reverse enables the operator to more readily engage the gears in a standing position, primarily due to the fact that there are a greater number of engaging projections (the teeth of the gears) than in the type where a clutch connection is used.

I have shown a transmission of the type wherein three speeds forward and one reverse is provided for. However, it is obvious that various other speed combinations may be obtained. Furthermore, it is obvious that various types of clutches may be used in the place of the specific type illustrated, for instance, one type of clutch that may be used for connecting the shafts 5 and 2 together and for connecting the gear 13 with the shaft 2 may be that type illustrated in the patent granted to W. A. McCarrell, May 20, 1924, No. 1,494,794. Another type is that illustrated in the patent to Payne No. 839,416, dated December 25, 1906. It is also obvious that other types of clutches may be used.

I claim as my invention:

1. In an automobile transmission the combination with a casing, a shaft extending into said casing and having that portion thereof arranged within the casing continuously splined from end to end, a plurality of gears on said shaft certain of which have splined connection with the splines of the shaft and certain others of which are freely rotatable on said splines, a counter-shaft, a plurality of gears on said counter-shaft held against axial displacement by the side walls of the casing certain of said gears meshing with the freely rotatable gear on the first mentioned shaft and inter-engaging means therebetween for holding the freely rotatable gear axially stationary.

2. An automobile transmission comprising a casing having two sets of alined openings in its end walls, a counter-shaft mounted in one set of alined openings, a spindle hub mounted on said counter-shaft and having formed thereon a series of speed changing gears, said hub and gears being held against axial displacement by the side walls of the casing, a power shaft extending into one end of the casing through one of said alined openings, a driven shaft extending into the casing through the corresponding opposite alined opening and having its end supported by said power shaft and continuously splined from end to end within said casing, an axially shiftable gear mounted on said shaft and having a splined connection therewith and shiftable into and out of engagement with one of the gears mounted on said counter-shaft, a gear mounted on said shaft and freely rotatable thereon and constantly meshing with one of the gears mounted on said counter-shaft, means on said gear engaging the gear on the counter-shaft to hold said gear against axial displacement, a dental clutch member splined on said driven shaft and having dental teeth on its opposite faces, adapted to be moved respectively into engagement with dental teeth on said freely rotatable gear or with dental teeth on said power shaft to connect said driven shaft with said freely rotatable gear or to connect said driven shaft directly with said power shaft.

In witness whereof, I SAMUEL O. WHITE have hereunto set my hand at Indianapolis, Indiana, this 7th day of November, A. D. one thousand nine hundred and twenty four.

SAMUEL O. WHITE.